No. 615,205. Patented Nov. 29, 1898.
A. J. ALLEN.
PLANTER.
(Application filed Mar. 12, 1898. Renewed Nov. 3, 1898.)
(No Model.)
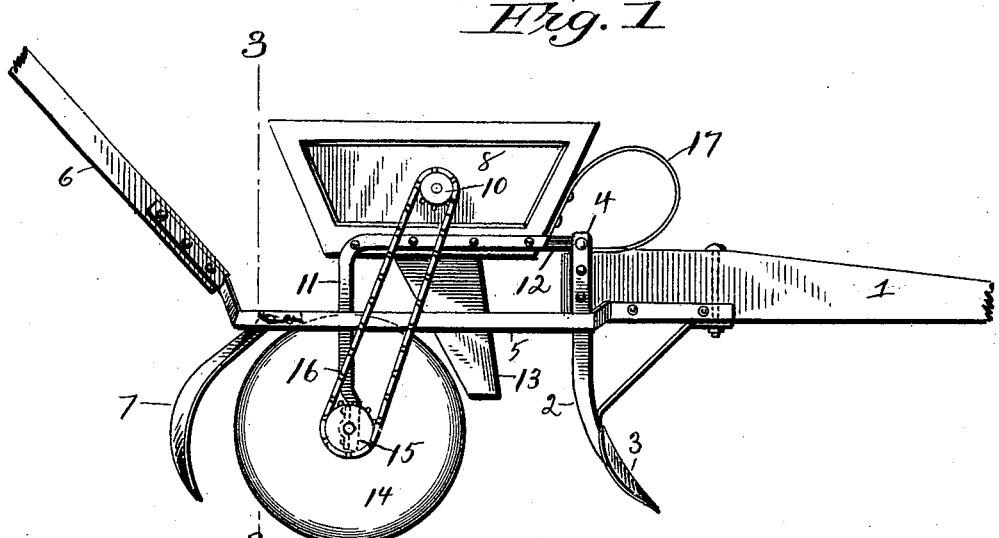
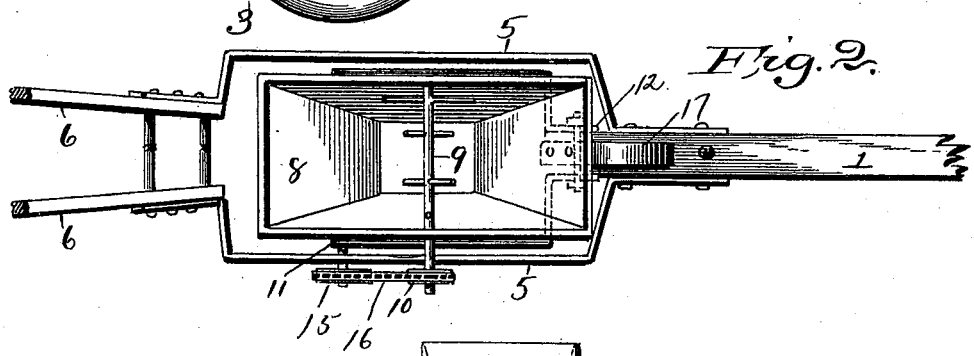
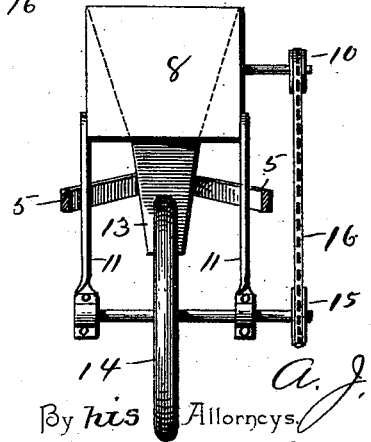
Witnesses
L. C. Hills.
W. A. Roberts.
A. J. Allen Inventor
By his Attorneys
Glasco & Co.

UNITED STATES PATENT OFFICE.

ANDREW JACKSON ALLEN, OF SHADYDALE, GEORGIA.

PLANTER.

SPECIFICATION forming part of Letters Patent No. 615,205, dated November 29, 1898.

Application filed March 12, 1898. Renewed November 3, 1898. Serial No. 695,418. (No model.)

*To all whom it may concern:*

Be it known that I, ANDREW JACKSON ALLEN, a citizen of the United States, residing at Shadydale, in the county of Jasper and State of Georgia, have invented certain new and useful Improvements in Planters; and I do hereby declare the following to be a full, clear, and exact description of the invention, such as will enable others skilled in the art to which it appertains to make and use the same.

My invention has relation to planters; and it consists in the novel construction and arrangement of its parts, as hereinafter described.

The object of the invention is to construct a planter having a light framework and a pivotally-mounted hopper, said hopper, together with the wheel operating the stirrers of the same, adapted to move perpendicularly, and thus ride over irregularities in the ground. A spring is provided whereby the wheel operating the hopper mechanism is maintained in contact at all times with the ground.

In the accompanying drawings, Figure 1 is a side elevation of the planter. Fig. 2 is a top plan view of the planter, and Fig. 3 is a transverse sectional view of the planter on the line 3 3 of Fig. 1.

The beam 1 constitutes the forward portion of the planter, and the standard 2 is dependent from the forward portion of the beam 1, the lower end of the said standard being provided with a suitable plow-point 3. The standard 2 is composed of two strips, the said strips being bolted at their upper ends on opposite sides of the beam 1, the extreme upper ends of the said strips terminating in the upwardly-extending lugs 4. The outwardly-bowed side strips 5 5 are bolted at their forward ends to the beam 1. The handles 6 6 of the planter are bolted to the rear ends of the side strips, as shown in Figs. 1 and 2. The covering-shovels 7 are attached at their upper ends to the side strips 5 5, as shown in Fig. 1. The hopper 8 is provided in its interior with a suitable revolving stirring device 9, the shaft of the said device extending through the side of the hopper and being provided with the ordinary sprocket-wheel 10. The angular arms 11 are bolted along their upper portions to the opposite sides of the hopper 8, the forward portions of the arms 11 passing in front of the hopper and terminating in the forwardly-extending lugs 12. The lugs 12 are pivotally connected to the lugs 4, as shown in Fig. 1, and thus the hopper 8 is pivotally mounted. The hopper has depending from its bottom a suitable chute 13. The wheel 14 is journaled between the lower ends of the arms 11, the shaft of the said wheel projecting at one side beyond the arm 11 and being provided with a sprocket-wheel 15. The sprocket-chain 16 surrounds the sprocket-wheels 15 and 10. The periphery of the wheel 14 is convexly formed, as shown in Fig. 3. The chute 13 terminates at its lower end in front of the wheel 14 and behind the plow-point 3, as shown in Fig. 1. The bow-spring 17 is secured at one end to the beam 1 and at its other end to the forward side of the hopper 8, as shown in Figs. 1 and 2, the operation of the said spring 17 having a tendency to maintain at all times the wheel 14 in close contact with the ground, and thus prevent unnecessary bobbing or jumping.

During the operation of the planter the shovel 3 opens the ground. The seed passes from the hopper through the chute 13 and is deposited in the opening, the rounded periphery of the wheel 14 passing over the seed and pressing it into the ground and the covering-shovels 7 throwing the earth upon the seed. Should the wheel 14 come in contact with stones or other obstructions, the said wheel will ride gently over the said obstructions, the springs 17 preventing any jumping, and the hopper 8 is elevated slightly. The relative positions of the sprocket-wheels 10 and 15 being constant, there is never any slack in the sprocket-chain 16. Therefore the stirring mechanism 9 is at all times operated without interference.

Having thus described my invention, what I claim as new, and desire to secure by Letters Patent, is—

1. A planter consisting of a suitable framework, a hopper having a suitable stirring mechanism, angular arms attached to the hopper, the forward ends of said arms being pivotally connected to the framework, the rear portions of said arms extending outward, a wheel journaled between the lower ends of said arms, said wheel adapted to operate the stirring mechanism of the hopper, a spring secured at one end to the framework and bearing at its outer end against the hopper and adapted to maintain the wheel in contact with the ground.

2. A planter consisting of a suitable framework, a beam adapted to carry a plow-standard, a plow-standard consisting of a pair of strips, said strips being attached at their upper ends to the beam, the upper ends of said strips terminating in lugs, a hopper having a suitable stirring mechanism, angle-arms fixed to said hopper and having forwardly-extending lugs, the lugs of the angle-arms being pivotally connected to the lugs of the standard, said arms having downwardly-extending portions, a wheel journaled between the lower ends of said arms, said wheel adapted to operate the stirring mechanism of the hopper, a spring secured at one end to the framework of the planter and bearing at its other end against the hopper and adapted to maintain the wheel in contact with the ground.

3. A planter consisting of a beam forming the forward portion thereof, a plow-point carried by said beam, outwardly-bowed strips attached at their forward ends to said beam, handles attached to the rear ends of said strips, a hopper carrying a suitable stirring mechanism, said hopper being pivotally connected to the rear end of the beam, a wheel connected to said hopper and adapted to operate the stirring mechanism, a spring confined at one end to the beam and at the other end to the hopper and adapted to maintain the wheel in contact with the ground.

In testimony whereof I affix my signature in presence of two witnesses.

ANDREW JACKSON ALLEN.

Witnesses:
 JOHN SPEARMON,
 J. L. PENNINGTON.